United States Patent [19]

Korsky et al.

[11] Patent Number: 4,715,062
[45] Date of Patent: Dec. 22, 1987

[54] SPEAKERPHONE CONTROL CIRCUIT HAVING LOW GAIN STATES AND METHOD FOR CONTROLLING GAIN OF SPEAKERPHONE

[75] Inventors: Vincent V. Korsky, Shelton; Raymond T. Pajer, Southbury, both of Conn.

[73] Assignee: TIE/communications, Inc., Shelton, Conn.

[21] Appl. No.: 714,721

[22] Filed: Mar. 22, 1985

[51] Int. Cl.$^4$ .............................................. H04M 9/08
[52] U.S. Cl. .................................... 379/390; 379/388; 379/407
[58] Field of Search ............... 179/100 L, 81 A, 81 B, 179/81 R, 170.2, 170.4, 170.6; 379/388, 389, 390, 420, 406, 407, 409; 370/32, 32.1

[56] References Cited

U.S. PATENT DOCUMENTS

| | | | |
|---|---|---|---|
| 3,601,549 | 8/1971 | Mitchell | 379/389 |
| 3,787,621 | 1/1974 | Barok | 379/390 |
| 3,952,166 | 4/1976 | Kato et al. | 379/389 |
| 3,963,868 | 6/1976 | Randmere et al. | 379/390 |
| 4,161,624 | 7/1979 | Brosow | 379/389 |
| 4,513,177 | 4/1985 | Nishino et al. | 379/389 |
| 4,571,461 | 2/1986 | Uno et al. | 379/390 |

FOREIGN PATENT DOCUMENTS 0094257 6/1983 Japan .

Primary Examiner—Gene Z. Rubinson
Assistant Examiner—R. Vaas
Attorney, Agent, or Firm—Kenyon & Kenyon

[57] ABSTRACT

A speakerphone control circuit is disclosed. The control circuit includes a first electronic switch coupled between the speakerphone microphone and a hybrid circuit coupled to the telephone line and a second electronic switch coupled between the speakerphone loudspeaker and the hybrid circuit coupled to the telephone line. A first sensing circuit for sensing the microphone signal and a second sensing circuit for sensing the received loudspeaker signal are provided. The outputs of the first and second sensing circuits are multiplexed and digitized and fed to a microprocessor controller. In response to the levels of the multiplexed signal, the microprocessor determines the state of the speakerphone from among four possible states, including a first talk state, low gain talk state, first listen state and low gain listen state. The low gain talk and listen states are provided by gating the respective first and second electronic switches on and off to chop the microphone or speaker signal, respectively, thereby attenuating the signals. This allows substantial minimization of spurious sidetone and echo signals and a lessening of harsh clipping effects. Furthermore, the first talk and listen states preferably are only enterable from each other upon passing through the low gain states.

68 Claims, 4 Drawing Figures

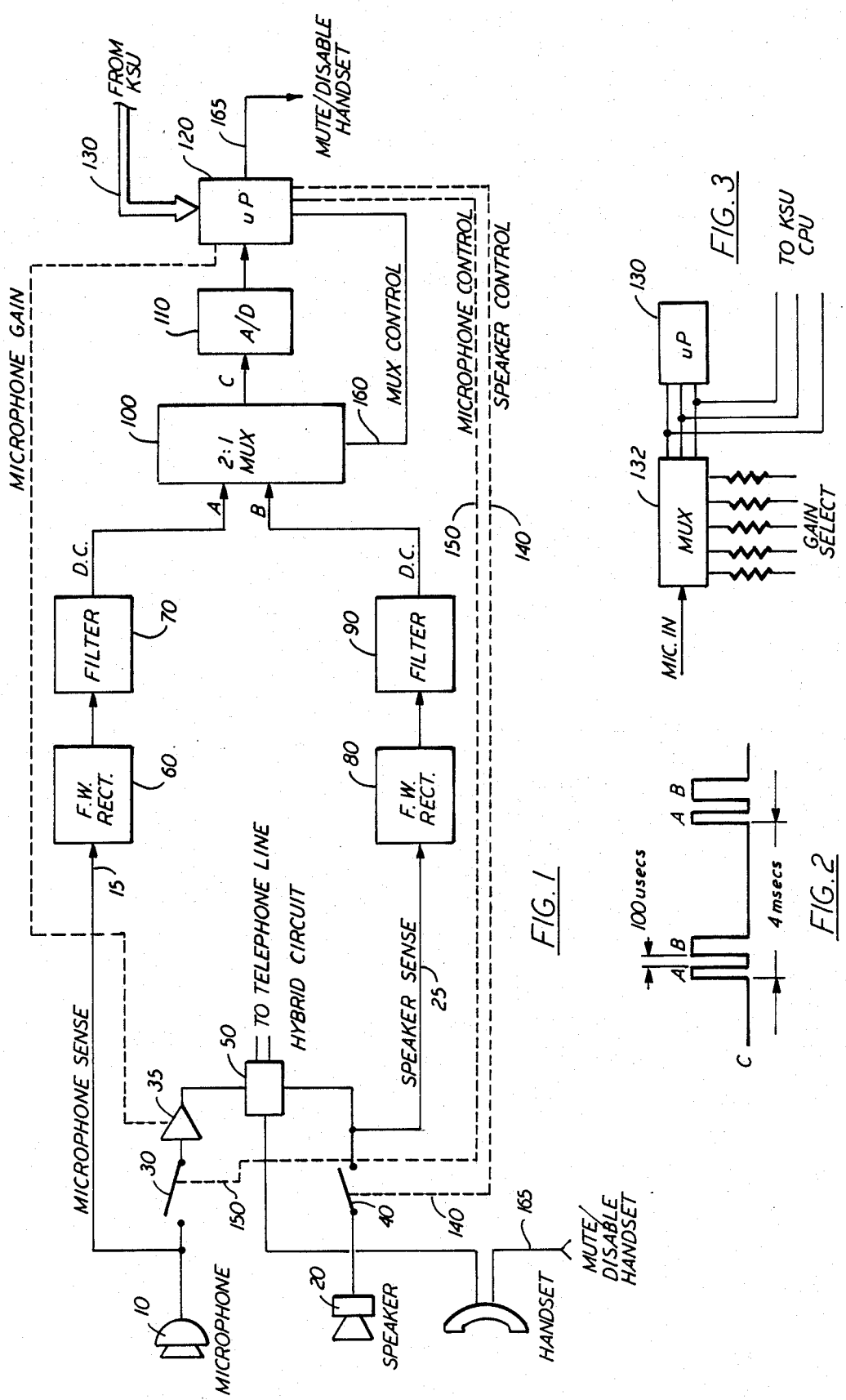

State Diagram

SPEAKERPHONE CONTROL CIRCUIT HAVING LOW GAIN STATES AND METHOD FOR CONTROLLING GAIN OF SPEAKERPHONE

BACKGROUND OF THE INVENTION

The present invention relates to the field of telephones, and in particular to speakerphones. More particularly, the present invention relates to a control circuit for a telephone speakerphone wherein the loudspeaker and microphone signal channels have low gain states provided for compensating for ambient and channel noise levels.

In a typical speakerphone circuit, both an input transducer or microphone and an output transducer or loudspeaker are provided. It is not possible for a user to speak and listen to another party at the same time when using a speakerphone because both the microphone and loudspeaker cannot be enabled at the same time. This is because if both the microphone and loudspeaker are enabled at the same time, the speaker output signal would be fed back into the microphone, resulting in instability of the system due to feedback. Accordingly, circuitry is necessary to disable the microphone and enable the loudspeaker during the "listen" mode, and to enable the microphone and disable the loudspeaker during the "talk" mode. In telephone systems having an optional speakerphone in addition to the conventional handset, the use of the speakerphone is often termed "hands free" mode.

In speakerphone applications, it is necessary to be able to compensate for ambient noise levels in the environment in which the speakerphone is located and noise on the telephone line communication channel. Furthermore, it is necessary to be able to distinguish between actual voice signals generated by the microphone and "echo" signals present on the microphone channel due to the reflection of noise signals on the speaker channel onto the microphone channel by system deviations from ideal. The same is true of objectionable "sidetone" signals, which are reflected noise signals present on the speaker channel which result from noise present on the microphone channel. The need to compensate for noise is due to the obvious requirement that a speakerphone must be able to receive input signals over a wide area, as opposed to the conventional handset, wherein only signals spoken directly into the receiver are transmitted, and noise is not a problem, and wherein the ear piece is closely coupled to the human ear, so that again noise is not a problem. In contrast, in speakerphone applications, compensation for noise levels in the environment must be made if proper speakerphone operation is to be obtained.

Additionally, prior art speakerphones suffer from objectionable harsh clipping of the trailing or leading parts of voice signals when a transition is made between "talk" mode and "listen" mode, or vice versa.

SUMMARY OF THE INVENTION

Accordingly, it is an object of the present invention to provide an improved control circuit for a speakerphone.

It is furthermore an object of the present invention to provide an improved control circuit for a speakerphone having low gain states in the microphone and loudspeaker channels to compensate for noise levels in the environment in which the speakerphone is located or on the communication channel.

It is furthermore another object of the present invention to provide an improved control circuit for a speakerphone which minimizes objectionable sidetone and echo signals.

It is yet still another object of the present invention to provide a speakerphone control circuit having low gain "listen" and "talk" states in addition to the standard "listen" and "talk" states.

It is still another object of the present invention to provide a speakerphone control circuit which minimizes objectionable clipping of voice signals when the speakerphone switches from "talk" to "listen" state or vice versa.

It is yet another object of the present invention to provide a speakerphone control circuit wherein the additional low gain states are provided by circuitry which chops the microphone or speaker channel signal to thereby attenuate the respective signals.

It is yet still another object of the present invention to provide a speakerphone control circuit which is controlled by a dedicated microprocessor contained within the speakerphone.

These and other objects are achieved according to one aspect of the present invention by a speakerphone control circuit comprising first electronic switch means coupled between an input transducer of the speakerphone and a telephone line, second electronic switch means coupled between an output transducer of the speakerphone and the telephone line, first means for sensing the level of a first signal present at an output from the input transducer, second means for sensing the level of a second signal present at an input to the output transducer, and control means coupled to the first and second sensing means and to the first and second electronic switch means for evaluating the first and second signals, the control means comprising means for determining whether the speakerphone should be in a first talk mode, a first listen mode, a low gain talk mode or a low gain listen mode, the first signal being attenuated in the low gain talk mode by a first control signal from the control means whereby the first electronic switch means is cyclically turned on and off and the second signal being attenuated in the low gain listen mode by a second control signal from the control means whereby the second electronic switch means is cyclically turned on and off.

According to another aspect of the present invention, these and other objects are achieved by a speakerphone control circuit comprising first means coupled between an input transducer of the speakerphone and a telephone line for selectively providing attenuation to a first signal present on an output from the input transducer, second means coupled between an output transducer of the speakerphone and the telephone line for selectively providing attenuation to a second signal present on an input to the output transducer, first means for sensing the level of the first signal, second means for sensing the level of the second signal, and control means coupled to the first and second sensing means and to the first and second selective attenuation means for evaluating the first and second signals, the control means comprising means for determining whether the speakerphone should be in a first talk mode, a first listen mode, a low gain talk mode or a low gain listen mode, the control means selecting from among the four modes of operation in dependence on the levels of the first and second signals such that the first talk mode and the first listen mode are only enterable from each other upon passing through the low gain modes.

Methods for controlling the gain of a speakerphone in accordance with the disclosed apparatus are also described.

Other objects, features and advantages of the present invention will be apparent from the description which follows.

BRIEF DESCRIPTION OF THE DRAWINGS

The present invention will be described in the following detailed description with reference to the drawings in which:

FIG. 1 is a block diagram of the speakerphone control circuit according to the invention;

FIG. 2 shows one of the signals in the block diagram of FIG. 1;

FIG. 3 illustrates circuitry shown in FIG. 1 in more detail; and

DETAILED DESCRIPTION

Figure 4:
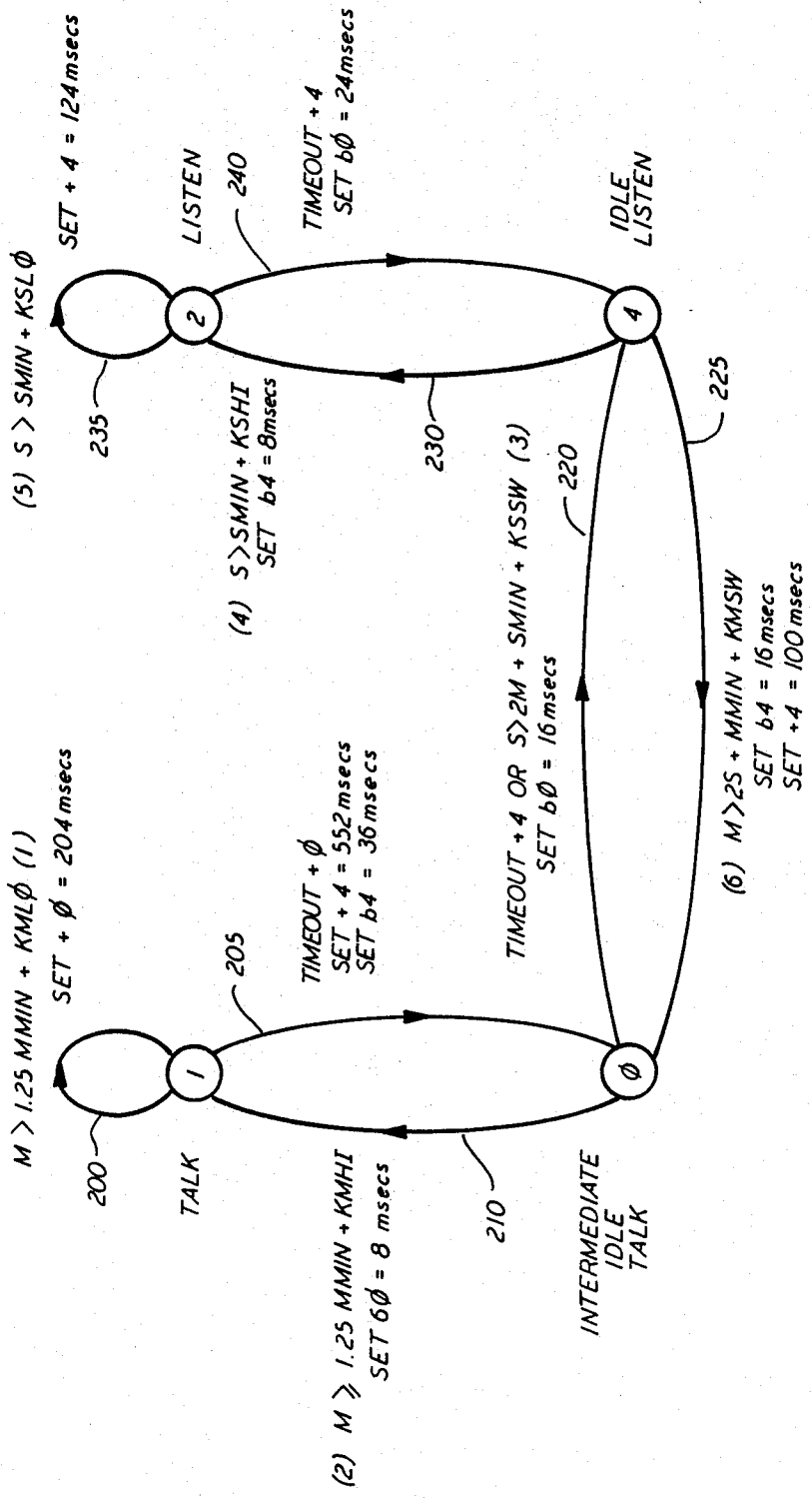
FIG. 4 is a state diagram showing the operation of the microprocessor of the system shown in FIG. 1.

With reference now to the drawings, FIG. 1 is a block diagram of the speakerphone control circuit according to the invention. The speakerphone includes input transducer or microphone 10 and output transducer or loudspeaker 20. Microphone 10 is coupled through an electronic switch 30 and preferably through variable amplifier/attenuator 35 to a hybrid circuit 50, known to those skilled in the art, which couples the speakerphone to the telephone line. Likewise, speaker 20 is coupled through an electronic switch 40 to the hybrid circuit 50. Hybrid circuit 50 couples signals from microphone 10 to the telephone line for transmission and receives signals from the telephone line for coupling to loudspeaker 20. A microphone sense signal on line 15 coupled to the microphone ahead of the electronic switch 30 is fed to a full wave rectifier stage 60, the output of which is fed to a filter stage 70. The filter stage 70 has a time constant of approximately 12 milliseconds, and provides an approximately d.c. or low frequency output signal corresponding to the average value of the microphone output signal. The full wave rectifier stage 60 preferably is an ideal rectifier stage comprising an operational amplifier, the design of which is well known to those skilled in the art. An ideal rectifier stage is necessary due to the low voltage levels of the microphone output signals. A simple full wave rectifier comprising only semiconductor rectifier diodes would not function properly, because the signal levels are often much less than typical semiconductor diode thresholds. Similarly, a speaker sense signal 25 is coupled to the speaker line between the hybrid circuit 50 and electronic switch 40. The speaker sense signal 25 is fed to full wave rectifier stage 80, which is similar to full wave rectifier stage 60. The output of full wave rectifier stage 80 is fed to a filter 90, whose characteristics are similar to those of filter 70. The outputs of filters 70 and 90 are coupled into a 2:1 multiplexer 100. Multiplexer 100 samples both filter output signals at 4 millisecond intervals as shown in FIG. 2. Both filter output signals preferably are sampled in quick succession at 100 microsecond spacing as shown in FIG. 2. The multiplexed output signal C is then coupled to an analog to digital converter 110, which converts the analog samples of the microphone and speaker signals into digital form, for processing by a microprocessor 120, which may be dedicated to control of the speakerphone circuit. Microprocessor 120, which may be a type 8048, receives signals from a central service unit, such as a key service unit (KSU) of a key telephone system to which the speakerphone is attached via bus 130. Microprocessor 120 provides speaker and microphone control signals 140 and 150, for controlling the respective electronic switches 40 and 30. Signals 140 and 150 are provided not only to enable and disable the loudspeaker and microphone at the appropriate times, but also to provide attenuation of the speaker and microphone signals, as will be described below. Furthermore, microprocessor 120 provides a multiplexer control signal 160 for controlling the sampling rate of multiplexer 100. Additionally, a mute/disable handset signal 165 is fed to the handset of the telephone station set when the speakerphone option is used to mute the handset earpiece to prevent coupling into the speakerphone and to disable the handset microphone. An additional signal may be provided to variable amplifier/attenuation stage 35, in order further to control the gain or attenuation levels of the microphone signal. The gain or attenuation levels provided by amplifier 35 may be discrete or continuous, although preferably they are discrete levels.

In addition to enabling or disabling the microphone or loudspeaker dependent upon the mode of the speakerphone, speaker control 140 and microphone control 150 signals are utilized to attenuate the microphone and speaker signals. This is accomplished by providing an oscillating control signal on control lines 140 and 150, preferably at 12 kHz or higher to avoid audio interference, with a duty cycle of 1 to 4 (¼ on to ¾ off). This will provide approximately 12 db of attenuation of the microphone or speaker signals. Accordingly, in order to provide the described low gain modes of operation, electronic switches 30 and 40 are turned on and off by the oscillating control signal on lines 150 and 140, respectively, thus chopping the microphone or speaker signal and providing the necessary attenuation.

FIG. 2 shows the way microprocessor 120 controls the sampling of signals A and B provided to multiplexer 100. As shown, the signal C, which is the output from the multiplexer, comprises successive samples of both speaker sense and microphone sense signals A and B, taken at 4 millisecond intervals. Both signals A and B are sampled successively and spaced at approximately 100 microseconds apart.

FIG. 4 is a state diagram illustrating the operation of microprocessor 120 in controlling the gain of the speakerphone control circuit. As shown in FIG. 4, the system has 4 different states, 0, 1, 2 and 4. State 1 is the "normal talk" state, i.e., a user is speaking into the microphone of the speakerphone and the microphone signal is not undergoing attenuation via control signal 150. State 2 is the "normal listen" state, i.e., a user is listening at the speakerphone and the speaker signal is not undergoing attenuation via control signal 140. States 0 and 4 are low gain states, wherein the gain of the microphone or speaker signals are attenuated by 12 db by gating electronic switches 30 or 40 on and off, at approximately 12 kHz or higher, with a duty cycle of 1:4 (¼ on to ¾ off). State 0 is known as the "idle talk" state, as it is a low gain talk mode state and the system is "idling," i.e., neither sufficient speaker or microphone signals are detected to switch the system to a normal listen or talk state. State 4 is known as the "idle listen" state because the speakerphone circuit is in a low gain listen mode when in this state. Again, in state 4, the system is idling. State 0, the idle talk state, however, is only an intermediate state. The speakerphone cannot remain in state 0 indefinitely. State 4, on the other hand, is the "quiescent" state, and provided sufficient microphone or speaker signals are not sensed, the speakerphone can remain indefinitely in state 4. This will be explained in more detail below.

The operation of the system will now be explained with reference to FIG. 4 using a hypothetical starting situation. Suppose a user is talking into the speaker 20 of the speakerphone circuit at sufficient volume. The system will then be in state 1, the talk state. Microprocessor 120 receives a sample of the microphone sense signal via multiplexer 100 and A/D converter 110. The microphone sense signal is denoted in FIG. 4 by M. If the microphone sense signal M is greater than some minimum value MMIN of the microphone sense signal multiplied by some constant, as shown in FIG. 4, 1.25, plus a threshold value KMLO as required by the system hardware, the speakerphone control circuit will remain in state 1, as shown by loop 200. This is indicated by the following equation:

$$M > 1.25 \text{ MMIN} + \text{KMLO}. \quad (1)$$

The minimum value of the microphone sense signal MMIN is determined by the minimum value sampled by microprocessor 120 over time. The minimum value of the microphone sense signal, for example, during the silent intervals between spoken speech, provides a reliable indication of the background noise in the environment. This minimum value MMIN is thus the approximate value of the noise.

By determining the minimum value of the microphone sense signal over time, if the noise level should increase, the value of MMIN will also increase. If the noise level should decrease, a new, lower value of MMIN will be obtained. Accordingly, the value MMIN tracks the noise level. This can be accomplished in the system software by periodically incrementing the minimum value if the noise level increases, and providing a new, lower value when it decreases.

As long as the microphone sense signal is greater than 1.25 MMIN+KMLO, the system stays in state 1, thus indicating that a user is talking into the microphone. Once the value of M drops below 1.25 MMIN+KMLO, for a period of time t0, which is set continuously in state 1 every time a microphone sample satisfies the inequality given by (1), the system will move to state 0 via line 205. Timeout t0 may be set, for example, at a value equal to 204 milliseconds, as shown in FIG. 4. When the system moves from state 1 to state 0, due to insufficient microphone signal for the time period t0, a new timeout t4 is set, preferably to 552 milliseconds. Accordingly, a transition from state 0 to state 4 will be made automatically if insufficient microphone signal is present to allow a transition back to state 1 after timeout t4. Additionally, a blocking delay time b4 is set, approximately to a value of 36 milliseconds. The blocking delay time b4, set when entering state 0 from state 1, is the amount of time before a decision whether a transition will be allowed to state 4 from the originating state, in this case state 0, in the absence of a timeout, i.e., if a voice interrupt occurs due to a sensed speaker signal. Accordingly, once state 0 is reached from state 1, a decision to enter state 4 cannot be made until at least 36 milliseconds have elapsed. State 0 is known as the idle talk state, and is a low gain state generated by chopping the microphone signal via the oscillating signal on line 150. An attenuation of approximately 12 db is obtained by chopping the signal at 12 kHz or higher with a duty cycle 1:4 (¼ on to ¾ off). As discussed, state 0 is an intermediate state. The system cannot remain indefinitely in state 0. There are two ways to leave state 0: via a timeout (in this case t4), or via a voice interrupt generated by receipt of a speaker or microphone signal.

In state 0, both the microphone and speaker sense signals are evaluated. If the microphone sense signal M meets the inquality:

$$M \geq 1.25 \text{ MMIN} + \text{KMHI} \quad (2)$$

where KMHI is a second threshold value used in determining whether the system should go from state 0 to 1, the system will move from state 0 to 1. KMHI is set at a somewhat higher level than the threshold KMLO in order to provide hystersis, i.e., in order to enter a particular state, a higher threshold is required than to leave that state. By moving from state 0 to state 1, the gain of the system is increased because the user is speaking. If the background noise level increases, a larger microphone sample level will be required in order to move to state 1, since the minimum microphone sample will have increased. Accordingly, the speakerphone adapts to the noise level. The user will be required to speak in a louder voice in order to switch the speakerphone to the talk state, and the system will not erroneously switch over simply because noise levels have increased.

When the system moves from state 0 to 1, as shown by line 210, a new blocking delay b0 is set, preferably at a value of 8 milliseconds. Accordingly, when the system reaches state 1 from state 0, a decision to return again to state 0 will not be made until a time period of at least 8 milliseconds has elapsed. Of course, if the microphone signal M satisfies the inequality (1) when in state 1, at least the time period given by timeout t0 (204 msecs.) must elapse before a return to state 0 may be made. The blocking delay b0, however, allows a return to be made to state 0 after a short time (8 msecs) in the event a noise signal having a rapid rate of rise momentarily is sensed, but which is thereafter insufficient to maintain the speakerphone in state 1. Accordingly, the 204 msec. timer t0 is not set unless "double confirmation" that the sensed signal is a voice signal, as determined by inequalities 1 and 2, is made. If inequality (2) is satisfied, but inequality (1) is not, the system will return to state 0 after the blocking delay time b0 of 8 msecs. Otherwise, the 204 msec. timer t0 is set and a timeout must occur to return to state 0.

If the microphone signal is below 1.25 MMIN+KMHI when in state 0, for the period of time given by timeout t4, which was set when moving from state 1 to state 0 (552 msecs.), or if the sensed speaker signal S satisfies the following inequality:

$$S > 2M + \text{SMIN} + \text{KSSW} \quad (3)$$

where KSSW is a speaker signal threshold value for the state 0 to 4 transition, the system will move from state 0 to state 4 via line 220. When moving from state 0 to state 4, a new blocking delay b0 is set at approximately 16 milliseconds. Accordingly, the system cannot make a decision to return to state 0 from state 4 until a 16 millisecond time interval has elapsed. The state 0 to state 4 transition inequality (3), above, is used because the system should only move from state 0 to state 4 if the speaker signal is sufficiently greater than the microphone signal, indicating that the user is listening and not talking. This is necessary because a sidetone signal generated by reflection in the hybrid circuit 50 of noise signals from the microphone 10 may reach the speaker sense line 25 from the microphone due to variation of the hybrid circuit 50 from the ideal. Accordingly, the system must be able to distinguish between voice signals received on the telephone line from the far end and nuisance sidetone signals generated by the microphone. The system therefore compares the sampled speaker signal with twice the sampled microphone signal plus the signal SMIN and the constant KSSW according to inequality (3). The signal SMIN is the minimum value of the speaker signal sensed by the microprocessor 120, and accordingly, represents the noise level. Since the sidetone generated as a result of microphone noise can never be greater than twice the sampled microphone signal, if the sensed speaker signal is greater than twice the microphone signal plus the noise signal and an arbitrary constant, microprocessor 120 determines that the user is no longer talking and thus listening and that therefore a transition should be made from the idle talk state 0 to idle listen state 4. As shown by the state diagram in FIG. 4, the idle listen state 4 or the listen state 2 can only be reached from talk state 1 by moving through idle talk state 0. Accordingly, if a transition is to be made from talk mode state 1 to listen mode state 2, or vice versa, both low gain states 0 and 4 must be traversed.

The use of low gain states 0 and 4 is important for two purposes. As discussed, the provision of these states allows spurious sidetone and echo (the latter being noise signals present on the microphone sense line due to reflection of noise signals on the speaker line) signals to be distinguished from voice signals. Accordingly, the sidetone signals can be reduced by attenuating signals on the microphone channel via switch 30. Similarly, as will be described below, echo signals from the speaker channel can also be attenuated via switch 40. This provides significant advantages as far as further processing of the sampled microphone and speaker signals is concerned, since it allows more accurate analog to digital conversion because signals of lower dynamic range can be handled, for example.

A second advantage of low gain states 0 and 4 resides in the fact that harsh clipping effects are minimized, since the system can only change from normal talk to normal listen mode, or vice versa, by traversing the two low gain states. This provides a more gradual transition between states, thus eliminating harsh, sudden transitions and clipping because the respective microphone or speaker signals are allowed to fade between talk-listen or listen-talk switching.

Idle listen state 4 is provided as the quiescent or rest state of the system. That is, if a user is not talking into the speakerphone and the signal is not in high gain listen state 2 due to the sensed value of the speaker signal, the system will remain in idle listen state 4 indefinitely. Idle listen state 4 is a low gain listen state, wherein the speaker signal is rapidly chopped by electronic switch 40 controlled by speaker control signal 140. This provides approximately 12 db of attenuation due to the gating of electronic switch 40 by a 12 kHz oscillating signal having a duty cycle of 1:4. A transition from idle listen state 4 to listen state 2 will be made if a sufficient speaker signal from the telephone line is sensed. Accordingly, as shown by state line 230, if the sensed speaker signal signal S satisfies the following inequality:

$$S > SMIN + KSHI \quad (4)$$

where SMIN is the minimum value of the speaker signal or the noise signal and KSHI is a constant threshold for the state 4 to state 0 transition, a transition will be made from state 4 to state 2. At the same time that the transition is made to state 2, a blocking delay b4 is set at approximately 8 milliseconds. This prevents a decision to return to state 4 from state 2 from being made for 8 msecs. Once in state 2, the inequality which applies is:

$$S > SMIN + KSLO \quad (5)$$

The speaker signal must be greater than SMIN, the minimum speaker level or noise level, plus a threshold value KSLO in order to stay in state 2 in the loop designated 235. KSLO is set at a value below KSHI to provide hysteresis. A timeout period t4 of 124 msecs. is set when entering state 2 once inequality (5) is satisfied. Once the speaker signal decreases below the value given by (5), for a time period t4 of approximately 124 milliseconds, a transition via line 240 will be made from state 2 to state 4. The timeout t4 set in order to move to state 4 from state 2 is less than the timeout set in order to move to state 0 from state 1 (204 msecs.), because it is considered preferable for it to be easier for a person at the speakerphone to interrupt. Accordingly, only a 124 msec. timer is provided to leave the listen state, whereas a 204 msec. timeout is provided in order to leave talk state 1. Upon the return to state 4, a new blocking delay b0, set at approximately 24 milliseconds, will be implemented. The blocking delay b0 prevents a decision from being made to move to state 0 from state 4 unless 24 milliseconds have elapsed.

Once in state 4, a transition can be made to state 0 via line 225 if the following inequality is satisfied:

$$M > 2S + MMIN + KMSW \quad (6)$$

Accordingly, in order to switch to the low gain talk state 0, the microphone sample must be greater than twice the speaker signal plus MMIN, the noise level, plus a constant threshold KMSW. As in the state 0 to 4 transition, the microphone sample must be at least twice as large as the speaker sample in order to eliminate confusion with echo signals from the speaker line reflected onto the microphone sense line by the hybrid circuit 50. Such echo signals might be caused by noise signals present on the telephone line, for example. As shown in FIG. 4, a timeout t4 of 100 msecs. and a blocking delay b4 of 16 msecs. are set when moving from state 4 to state 0. Accordingly, a timeout to state 4 from state 0 will occur after 100 msecs. unless a decision is made to move to state 1 via line 210 due to satisfaction of inequality (2), and a decision to return to state 4 due to a voice interrupt can only be made after at least 16 msecs. have elapsed (satisfaction of inequality (3)).

One exception may be provided to having state 4 as the quiescent system state. State 4 is normally the state to which the system returns when the operator of the speakerphone is not talking, since it is preferable that the person with the speakerphone be always able to listen to the person at the far end. In this way, the person with the speakerphone knows that he is listening to someone and that communications has not been interrupted. One feature, however, is often provided in key and branch exchange telephone systems called the "call announce" feature, which allows a person to call a speakerphone, announce his call with a distinctive tone and listen in to the room where the speakerphone is located to determine if someone in the room but temporarily away from the immediate vicinity of the speakerphone answers. In this instance, it is perferable that the speakerphone be in the low gain talk state 0 so that the person calling can determine if someone is present to answer. Accordingly, when the "call announce" feature is provided and used, the quiescent state of the system is changed from state 4 to state 0, i.e., state 4 becomes an intermediate state having a timeout period to state 0 and state 0 becomes a stable low gain state.

Table 1 summarizes the 4 states of the present system and the manner in which the microphone (MIC) and speaker (SPK) signals are controlled. Table 2 defines the various signal samples, threshold constants, blocking delays and timeouts described above with respect to the state diagram. The various thresholds (K) are arbitrary and depend on the attenuation levels provided by the hardware, although, as discussed, low and high thresholds are used to provide system hysteresis.

TABLE 1

|  | State | MIC | SPK |
|---|---|---|---|
| Talking | 1 | ON, 0 dB | OFF |
| Listening | 2 | OFF | ON, 0 dB |
| Idle Talk | 0 | Chopped, −12 dB | OFF |
| Idle Listen | 4 | OFF | Chopped, −12 dB |

TABLE 2

| | |
|---|---|
| M — | MIC sample |
| S — | Speaker sample |
| MMIN — | Minimum MIC sample |
| SMIN — | Minimum SPK sample |
| KMLO — | state 1 self loop threshold |
| KMHI — | state 0 to 1 transition threshold |
| KMSW — | state 4 to 0 transition threshold |
| KSLO — | state 2 self loop threshold |
| KSHI — | state 4 to 2 transition threshold |
| KSSW — | state 0 to 4 transition threshold |
| (b0) e.g. — | Blocking delay before transition allowed to switch to state 0. |
| (t0) e.g. — | Timeout to state 0. |

FIG. 3 illustrates the manner in which additional, non chopped levels of gain/attenuation are provided for the microphone signal via gain/attenuation stage 35. As shown in FIG. 3, three lines of bus 130 which couples signals from the central processing unit of the central key service unit (KSU) to the station set are connected to three output lines of microprocessor 130. The output lines are wired directly together and comprise a wired OR connection. Accordingly, signals for controlling the gain of the microphone signal from the KSU CPU or signals from microprocessor 130 can control the gain of stage 35. Stage 35 might comprise, for example, a multiplexer, such as a CMOS type 4051 multiplexer, which selects various gains or levels of attenuation from a resistor bank, depending upon the address inputs to the multiplexer. These gains/attenuations are fixed gains/attenuations, and are provided in addition to the attenuation provided by chopping the microphone signal via electronic switch 30.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A speakerphone control circuit comprising:
first electronic switch means coupled between an input transducer of the speakerphone and a telephone line;
second electronic switch means coupled between an output transducer of the speakerphone and the telephone line;
first means for sensing the level of a first signal present on an output from the input transducer;
second means for sensing the level of a second signal transmitted to an input to the output transducer; and
control means coupled to said first and second sensing means and to said first and second electronic switch means for evaluating said first and second signals, said control means comprising means for determining whether said speakerphone should be in a first talk mode, a first listen mode, a low gain talk mode or a low gain listen mode, the first signal being attenuated in said low gain talk mode by a first control signal from said control means whereby said first electronic switch means is cyclically turned on and off and said second signal being attenuated in said low gain listen mode by a second control signal from said control means whereby said second electronic switch means is cyclically turned on and off.

2. The control circuit recited in claim 1 wherein said first and second sensing means each comprise:
rectifier means having the respective first or second signal as an input; and
filter means coupled to an output of the rectifier means for producing a low frequency signal.

3. The control circuit recited in claim 2, further comprising:
multiplexer means having the low frequency output signals of said first and second sensing means as inputs for successively sampling said low frequency signals and for producing a multiplexed signal containing samples of said low frequency signals from said first and second sensing means; and
analog to digital converted means for converting said multiplexed signal into a digital signal, said digital signal being coupled to said control means.

4. The control circuit recited in claim 1, wherein said control means comprises microprocessor means.

5. The control circuit recited in claim 1, wherein said first and second control signals each comprise oscillating signals having a frequency of at least 12 kHz.

6. The control circuit recited in claim 1, further comprising additional means for selectively adjusting the level of said first signal coupled to the telephone line.

7. The control circuit recited in claim 6, wherein said additional means comprises means for selecting from a plurality of discrete attenuation or gain levels.

8. The control circuit recited in claim 5, wherein said first and second control signals each have a duty cycle of approximately 25% on to 75% off.

9. The control circuit recited in claim 1, further comprising means for muting or disabling an input transducer of a handset coupled to said speakerphone when said speakerphone is selected by a user.

10. The control circuit recited in claim 3, wherein said multiplexer samples both said low frequency signals in succession at intervals of approximately 4 milliseconds.

11. The control circuit recited in claim 1, wherein said control means selects from among said four modes of operation, said four modes of operation including said first talk mode, low gain talk mode, first listen mode and low gain listen mode, said first talk mode and first listen mode being enterable from each other only upon passing through said low gain modes.

12. The control circuit recited in claim 1, wherein said control means switches said speaker phone to the low gain listen mode from said first talk mode when the level of the first signal from said input transducer drops below a predetermined threshold value.

13. The control circuit recited in claim 1, wherein said control means switches said speakerphone to the low gain listen mode from said first listen mode when said second signal to said output transducer drops below a predetermined threshold value.

14. The control circuit recited in claim 1, wherein, when said speakerphone is in a talk mode, said control means controls whether said speakerphone is in said first talk mode or said low gain talk mode by comparing the level of said first signal to a noise level of said first signal.

15. The control circuit recited in claim 1, wherein, when said speakerphone is in a listen mode, said control means controls whether said speakerphone is in said first listen mode or said low gain listen mode by comparing the level of said second signal to a noise level of said second signal.

16. The control circuit recited in claim 14, wherein said control means determines said noise level from a minimum value of said first signal.

17. The control circuit recited in claim 15, wherein said control means determines said noise level from a minimum value of said second signal.

18. The control circuit recited in claim 16 wherein said control means periodically increments the minimum value of said first signal if said noise level increases.

19. The control circuit recited in claim 17 wherein said control means periodically increments the minimum value of said second signal if said noise level increases.

20. The control circuit recited in claim 1, wherein said control means is disposed in the speakerphone.

21. A method for controlling the gain of a speakerphone comprising the steps of:
sensing the level of a first signal present on an output from an input transducer of the speakerphone;
sensing the level of a second signal transmitted to an input to an output transducer of the speakerphone; and
evaluating said first and second signals, said step of evaluating comprising determining whether said speakerphone should be in a first talk mode, a first listen mode, a low gain talk mode or a low gain listen mode, the first signal being attenuated in said low gain talk mode by generating a first control signal whereby first electronic switch means coupled between the input transducer of the speakerphone and a telephone line is cyclically turned on and off and said second signal being attenuated in said low gain listen mode by generating a second control signal whereby second electronic switch means coupled between the output transducer of the speakerphone and the telephone line is cyclically turned on and off.

22. The method recited in claim 21 wherein said steps of sensing each comprise the steps of:
rectifying the respective first or second signal; and
filtering the rectified signal to produce a low frequency signal.

23. The method recited in claim 22, further comprising the steps of:
successively sampling said low frequency signals and producing a multiplexed signal containing samples of said low frequency signals; and
converting said multiplexed signal into a digital signal.

24. The method recited in claim 21, wherein said first and second control signals each comprise oscillating signals having a frequency of at least 12 kHz.

25. The method recited in claim 21, further comprising selectively adjusting the level of said first signal coupled to the telephone line.

26. The method recited in claim 25, wherein said step of adjusting comprises selecting from a plurality of discrete attenuation or gain levels.

27. The method recited in claim 24, wherein said first and second control signals each have a duty cycle of approximately 25% on to 75% off.

28. The method recited in claim 21, further comprising the step of muting or disabling an input transducer of a handset coupled to said speakerphone when said speakerphone is selected by a user.

29. The method recited in claim 23, wherein said step of sampling comprises sampling both said low frequency signals in succession at intervals of approximately 4 milliseconds.

30. The method recited in claim 21, wherein said step of evaluating comprises selecting from among said four modes of operation, said four modes of operation including said talk mode, low gain talk mode, listen mode and low gain listen mode, said talk mode and listen mode being enterable from each other only upon passing through said low gain modes.

31. The method recited in claim 21, wherein said step of evaluating switches said speakerphone to the low gain listen mode from said talk mode when the level of said first signal from said input transducer drops below a predetermined threshold value.

32. The method recited in claim 21, wherein said step of evaluating switches said speakerphone to the low gain listen mode from said listen mode when the level of said second signal from said output transducer drops below a predetermined threshold value.

33. The method recited in claim 21, wherein, when said speakerphone is in a talk mode, said step of evaluating comprises controlling whether said speakerphone is in said first talk mode or said low gain talk mode by comparing the level of said first signal to a noise level of said first signal.

34. The method recited in claim 21, wherein, when said speakerphone is in a listen mode, said step of evaluating comprises controlling whether said speakerphone is in said first listen mode or said low gain listen mode by comparing the level of said second signal to a noise level of said second signal.

35. The method recited in claim 33, wherein said step of evaluating comprises determining said noise level from a minimum value of said first signal.

36. The method recited in claim 34, wherein said step of evaluating comprises determining said noise level from a minimum value of said second signal.

37. The method recited in claim 35, wherein said step of evaluating comprises periodically incrementing the minimum value of said first signal if said noise level increases.

38. The method recited in claim 36, wherein said step of evaluating comprises periodically incrementing the minimum value of said second signal if said noise level increases.

39. The method recited in claim 21 wherein said step of evaluating comprises evaluating said first and second signals at said speakerphone.

40. A speakerphone control circuit comprising:
first means coupled between an input transducer of the speakerphone and a telephone line for selectively providing attenuation to a first signal present on an output from the input transducer;
second means coupled between an output transducer of the speakerphone and the telephone line for selectively providing attenuation to a second signal transmitted to an input to the output transducer;
first means for sensing the level of the first signal;
second means for sensing the level of the second signal; and
control means coupled to said first and second sensing means and to said first and second selective attenuation means for evaluating said first and second signals, said control means comprising means for determining whether said speakerphone should be in a first talk mode, a first listen mode, a low gain talk mode or a low gain listen mode, said control means selecting from among said four modes of operation in dependence on the levels of said first and second signals such that said first talk mode and said first listen mode are only enterable from each other upon passing through said low gain modes, said control means switching said speakerphone to one of said low gain modes from said first talk mode when the level of said first signal from said input transducer drops below a predetermined threshold level or to one of said low gain modes from said first listen mode when the level of said second signal to said output transducer drops below a predetermined threshold value.

41. The control circuit recited in claim 40 wherein said first and second sensing means each comprise:
rectifier means having the respective first or second signal as an input; and
filter means coupled to an output of the rectifier means for producing a low frequency signal.

42. The control circuit recited in claim 41, further comprising:
multiplexer means having the low frequency output signals of said first and second sensing means as inputs for successively sampling said low frequency signals and for producing a multiplexed signal containing samples of said low frequency signals from said first and second sensing means; and
analog to digital converter means for converting said multiplexed signal into a digital signal, said digital signal being coupled to said control means.

43. The control circuit recited in claim 40, wherein said control means comprises microprocessor means.

44. The control circuit recited in claim 40, wherein said first selective attenuation means comprises first electronic switch means and said second selective attenuation means comprises second electronic switch means, said first signal being attenuated in said low gain talk mode by a first control signal from said control means whereby said first electronic switch means is cyclically turned on and off and said second signal being attenuated in said low gain listen mode by a second control signal from said control means whereby said second electronic switch means is cyclically turned on and off.

45. The control circuit recited in claim 42, wherein said multiplexer samples both said low frequency signals in succession.

46. The control circuit recited in claim 40, wherein said control means switches said speakerphone to the low gain listen mode from said first talk mode when the level of said first signal from said input transducer drops below a predetermined threshold level.

47. The control circuit recited in claim 40, wherein said control means switches said speakerphone to the low gain listen mode from said first listen mode when the level of said second signal to said output transducer drops below a predetermined threshold value.

48. The control circuit recited in claim 40, wherein, when said speakerphone is in a talk mode, said control means controls whether said speakerphone is in said first talk mode or said low gain talk mode by comparing the level of said first signal to a noise level of said first signal.

49. The control circuit recited in claim 40, wherein, when said speakerphone is in a listen mode, said control means controls whether said speakerphone is in said first listen mode or said low gain listen mode by comparing the level of said second signal to a noise level of said second signal.

50. The control circuit recited in claim 48, wherein said control means determines said noise level from a minimum value of said first signal.

51. The control circuit recited in claim 49, wherein said control means determines said noise level from a minimum value of said second signal.

52. The control circuit recited in claim 50 wherein said control means periodically increments the minimum value of said first signal if said noise level increases.

53. The control circuit recited in claim 51 wherein said control means periodically increments the minimum value of said second signal if said noise level increases.

54. The control circuit recited in claim 40, wherein said control means is disposed in the speakerphone.

55. A method for controlling the gain of a speakerphone comprising the steps of:
sensing the level of a first signal present on an output from an input transducer of the speakerphone;
sensing the level of a second signal transmitted on an input to an output transducer of the speakerphone; and
evaluating said first and second signals, said step of evaluating comprising determining whether said speakerphone should be in a first talk mode, a first listen mode, a low gain talk mode or a low gain listen mode, said step of evaluating comprising selecting from among said four modes of operation in dependence on the levels of said first and second signals, said first talk mode and said first listen mode only being enterable from each other upon passing through said low gain modes, said step of evaluating comprising switching said speakerphone to one of said low gain modes from said first talk mode when the level of said first signal from said input transducer drops below a predetermined threshold value or to one of said low gain modes from said first listen mode when the level of said second signal to said output transducer drops below a predetermined threshold value.

56. The method recited in claim 55 wherein said steps of sensing each comprise the steps of:
rectifying the respective first or second signal; and
filtering the rectified signal to produce a low frequency signal.

57. The method recited in claim 56, further comprising the steps of:
successively sampling said low frequency signals and producing a multiplexed signal containing samples of said low frequency signals; and
converting said multiplexed signal into a digital signal.

58. The method recited in claim 57, wherein said step of sampling comprises sampling both said low frequency signals in succession.

59. The method recited in claim 55 wherein said first signal is attenuated in said low gain talk mode by generating a first control signal whereby first electronic switch means coupled between the input transducer of the speakerphone and a telephone line is cyclically turned on and off and said second signal is attenuated in said low gain listen mode by generating a second control signal whereby second electronic switch means coupled between the output transducer of the speakerphone and the telephone line is cyclically turned on and off.

60. The method recited in claim 55, wherein said step of evaluating switches said speakerphone to the low gain listen mode from said first talk mode when the level of said first signal from said input transducer drops below a predetermined threshold value.

61. The method recited in claim 55, wherein said step of evaluating switches said speakerphone to the low gain first listen mode from said listen mode when the level of said second signal to said output transducer drops below a predetermined threshold value.

62. The method recited in claim 55, wherein, when said speakerphone is in a talk mode, said step of evaluating comprises controlling whether said speakerphone is in said first talk mode or said low gain talk mode by comparing the level of said first signal to a noise level of said first signal.

63. The method recited in claim 55, wherein, when said speakerphone is in a listen mode, said step of evaluating comprises controlling whether said speakerphone is in said first listen mode or said low gain listen mode by comparing the level of said second signal to a noise level of said second signal.

64. The method recited in claim 62, wherein said step of evaluating comprises determining said noise level from a minimum value of said first signal.

65. The method recited in claim 63, wherein said step of evaluating comprises determining said noise level from a minimum value of said second signal.

66. The method recited in claim 64, wherein said step of evaluating comprises periodically incrementing the minimum value of said first signal if said noise level increases.

67. The method recited in claim 65, wherein said step of evaluating comprises periodically incrementing the minimum value of said second signal if said noise level increases.

68. The method recited in claim 55 wherein said step of evaluating comprises evaluating said first and second signals at said speakerphone.

* * * * *